(12) United States Patent
Arcot et al.

(10) Patent No.: US 9,109,914 B2
(45) Date of Patent: Aug. 18, 2015

(54) ENERGY EFFICIENT ROUTING USING AN IMPEDANCE FACTOR

(71) Applicant: Navteq B.V., Veldhoven (NL)

(72) Inventors: Praveen J. Arcot, Naperville, IL (US); Justin M. Spelbrink, San Jose, CA (US); Finn A. Swingley, Chicago, IL (US); Matthew G. Lindsay, San Jose, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/962,687

(22) Filed: Aug. 8, 2013

(65) Prior Publication Data

US 2013/0322694 A1     Dec. 5, 2013

Related U.S. Application Data

(62) Division of application No. 13/093,193, filed on Apr. 25, 2011, now Pat. No. 8,554,473.

(51) Int. Cl.
*G01C 21/34* (2006.01)
*G06K 9/00* (2006.01)

(52) U.S. Cl.
CPC ........ *G01C 21/3469* (2013.01); *G01C 21/3492* (2013.01); *G06K 9/00818* (2013.01)

(58) Field of Classification Search
CPC ........... G02C 21/3469; G02C 21/3453; G02C 21/3492; G06K 9/00818
USPC ................. 701/117, 119, 409, 411, 414, 139
See application file for complete search history.

(56) References Cited

U.S. PATENT DOCUMENTS

| | | |
|---|---|---|
| 5,742,922 A | 4/1998 | Kim |
| 5,913,917 A | 6/1999 | Murphy |
| 6,005,494 A | 12/1999 | Schramm |
| 2007/0005237 A1 | 1/2007 | Needham et al. |
| 2008/0004802 A1* | 1/2008 | Horvitz .......................... 701/209 |
| 2009/0005965 A1 | 1/2009 | Forstall et al. |
| 2010/0057339 A1* | 3/2010 | Pryakhin et al. .............. 701/200 |
| 2010/0094532 A1* | 4/2010 | Vorona .......................... 701/119 |
| 2010/0235077 A1* | 9/2010 | Chan ............................. 701/200 |

(Continued)

FOREIGN PATENT DOCUMENTS

EP    2136182    12/2009

OTHER PUBLICATIONS

International Search Report and Written Opinion from application PCT/US12/33982, mailed Jun. 26, 2012.

(Continued)

*Primary Examiner* — Khoi Tran
*Assistant Examiner* — Adam Mott
(74) *Attorney, Agent, or Firm* — Lempia Summerfield Katz LLC

(57) ABSTRACT

A method and system for calculating an energy efficient route is disclosed. A route calculation application calculates one or more routes from an origin to a destination. For each of the routes, the route calculation application uses impedance factor data associated with each segment in the route. The impedance factor is calculated using probe data when the probe data is available for a road segment. When probe data is unavailable, the impedance factor is calculated using machine learning techniques that analyze the results of the impedance factor classifications for road segments having probe data.

19 Claims, 7 Drawing Sheets

(56) References Cited

U.S. PATENT DOCUMENTS

2010/0286909 A1  11/2010  Tate, Jr. et al.
2012/0022781 A1* 1/2012  Wilson .......................... 701/410

OTHER PUBLICATIONS

International Report on Patentability from PCT/US2012/033982, Mar. 18, 2014, WO.

* cited by examiner

ENERGY EFFICIENT ROUTING USING AN IMPEDANCE FACTOR

REFERENCE TO RELATED APPLICATIONS

This application is a divisional under 37 C.F.R. §1.53(b) and 35 U.S.C. §121 of U.S. patent application Ser. No. 13/093,193 filed Apr. 25, 2011, which is hereby incorporated by reference in its entirety.

FIELD

The present invention relates generally to energy efficient routing, and more particularly, relates to cost values used by a routing algorithm to calculate an energy efficient route.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a Global Positioning Satellite (GPS) system), the navigation system can examine various potential routes between the origin and destination locations to determine the optimum route.

The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. Roads in the geographic region may be represented in the geographic database with one or more road segments. Each road segment is associated with two nodes; one node represents the point at one end of the road segment and the other node represents the point at the other end of the road segment. Alternatively, roads may be represented with curves, such as spline, Bezier, and clothoid curves.

The geographic database also includes information about the represented roads, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, restaurants, hotels, airports, gas stations, stadiums, police stations, and so on.

Although navigation systems provide many important features, there continues to be room for new features and improvements. For example, some navigation systems calculate routes to minimize the vehicle's fuel or energy consumption. Such a route is sometimes referred to as a "green route." There are many factors that determine a vehicle's fuel or energy consumption as the vehicle travels along a particular route. After distance, the biggest factor in fuel consumption is the number of accelerations and/or decelerations a vehicle makes along a given route.

To calculate an energy efficient route, the navigation system uses a route calculation algorithm, such as the Dijkstra or the A* search algorithm. These search algorithms use a segment cost to calculate a route. The route calculation algorithm evaluates road segments from an origin to a destination and identifies the route with the least total segment cost. It would be beneficial for the segment cost to reflect an expected number of accelerations and decelerations a vehicle makes while traveling on the road segment.

SUMMARY

A first computer-implemented method for calculating road segment cost for energy efficient routing is described. The method includes selecting a road segment with associated probe data, dividing the road segment into a plurality of sub-segments, calculating an average speed for each of the sub-segments using the probe data, and calculating a speed slope for each sub-segment. The speed slope equals the average speed of the sub-segment less the average speed of an adjacent sub-segment divided by the average speed of the sub-segment (speed slope=(avg. speed $s_i$-avg. speed $s_{i+1}$)/avg. speed $s_i$). The method also includes calculating a sum of speed slopes by adding the speed slope values for only those sub-segments having a negative value of speed slope and classifying the road segment based on the sum of speed slopes.

A second computer-implemented method for calculating road segment cost for energy efficient routing is also described. The method includes selecting a sample of road segments. The road segments in the sample have been classified with one of a plurality of impedance factors, which represents a probability that a vehicle needs to decelerate while traveling on the road segment. The method also includes calculating a probability that a road segment in the sample has been classified with a particular impedance factor, calculating a conditional probability of each impedance factor for a plurality of map database attributes, calculating entropy of the plurality of impedance factors, calculating conditional entropy for each of the plurality of map database attributes, and calculating the information gain using the entropy and the conditional entropy calculations. The method also includes creating a decision tree based on the information gain calculation and classifying the road segment based on the decision tree.

A computer-implemented method for calculating an energy efficient route is also described. The method includes obtaining an origin and a destination associated with a road network. The method also includes calculating an energy efficient route from the origin to the destination using a routing algorithm. The routing algorithm uses impedance factors for road segments being evaluated by the routing algorithm. The impedance factors represent a probability that a vehicle needs to decelerate while traveling on the road segment.

A navigation system that calculates an energy efficient route is also described. The navigation system includes a user interface that allows a user to request route information from a first location to a second location. The navigation system also includes a geographic database containing road segment records that include data that represent roads in a geographic area that includes the first and second locations. The road segment records include an impedance factor associated with a road segment. The impedance factor represents a probability that a vehicle needs to decelerate while traveling on the road segment. The navigation system also includes a processor that executes a route calculation application that calculates a route that minimizes energy consumption when traveling from the first location to the second location. The route is calculated using segment costs, which are based on the impedance factor.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Navigation System

Figure 1:
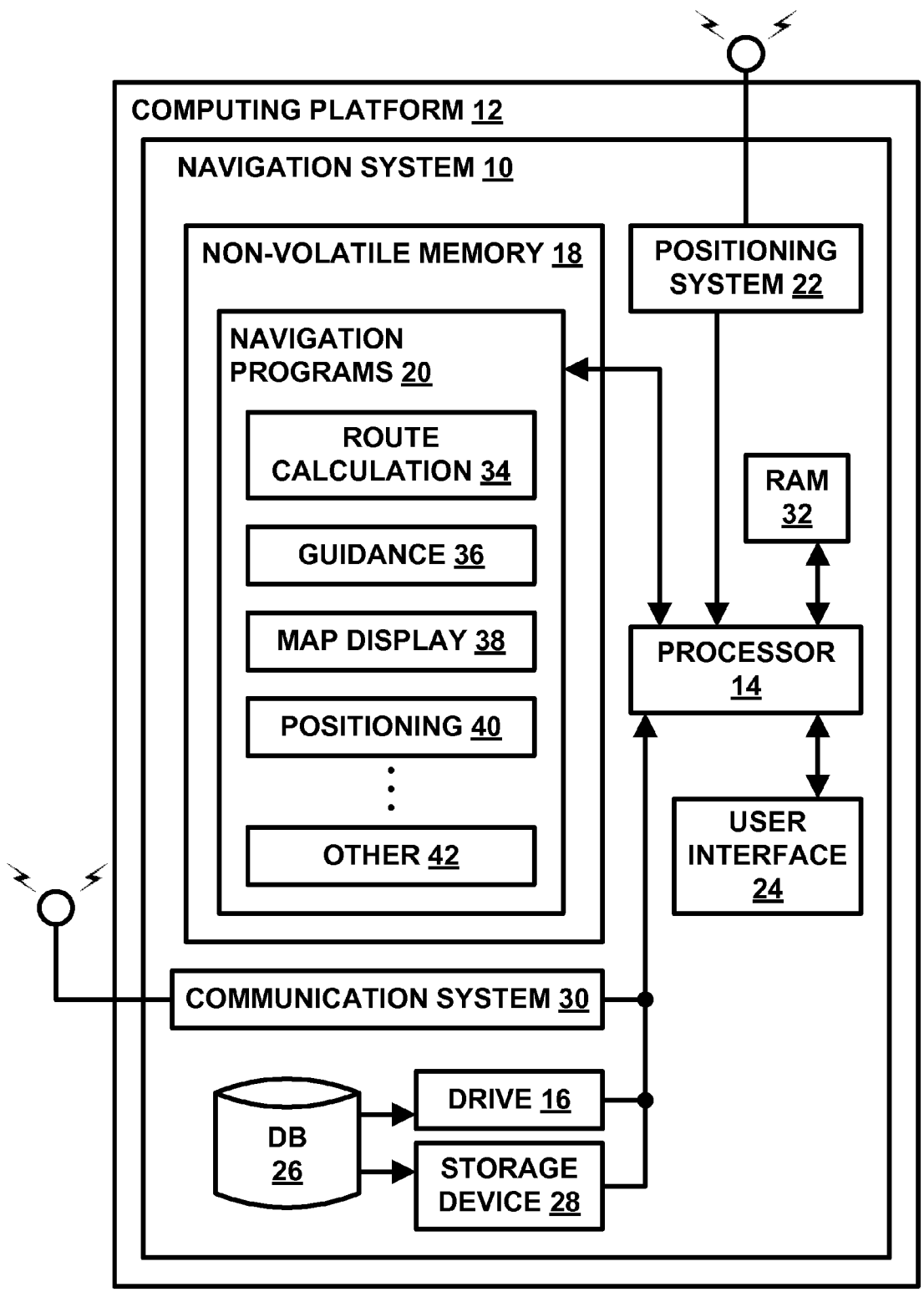
FIG. 1 is a block diagram of a navigation system, according to an example.

FIG. 1 is a block diagram of a navigation system 10 associated with a computing platform 12. The computing platform 12 may be associated with a vehicle. Alternatively, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other positioning technologies. The positioning system 22 may also include suitable sensing devices that measure the traveling distance, speed, direction, orientation, and so on. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, which is installed in the drive 16 so that the geographic database 26 can be read and used by the navigation system 10. In one embodiment, the navigation system 10 also includes a storage device 28, such as a hard disk or memory card, on which a portion or the entire geographic database 26 is stored. In one embodiment, the geographic database 26 may be a geographic database published by NAVTEQ North America, LLC of Chicago, Ill.

The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 32 associated with the processor 14. The navigation system 10 uses the geographic database 26 stored on the storage medium and/or storage device 28, possibly in conjunction with the outputs from the positioning system 22 and the communications system 30, to provide various navigation features and functions.

The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching). Other functions and programming 42 may be included in the navigation system 10. The navigation application software programs 20 may be written in a suitable computer programming language such as C, C++, or Java.

The processor 14 also receives input from the user interface 24. For example, a user of the navigation system 10 may enter an origin and a destination via the user interface 24. Alternatively, the navigation system may use its current position from the positioning system 22 as the origin. In this example, the positioning application 40 performs map matching to determine what road segment represents the navigation system's position on the road network.

II. Geographic Database

Figure 2:
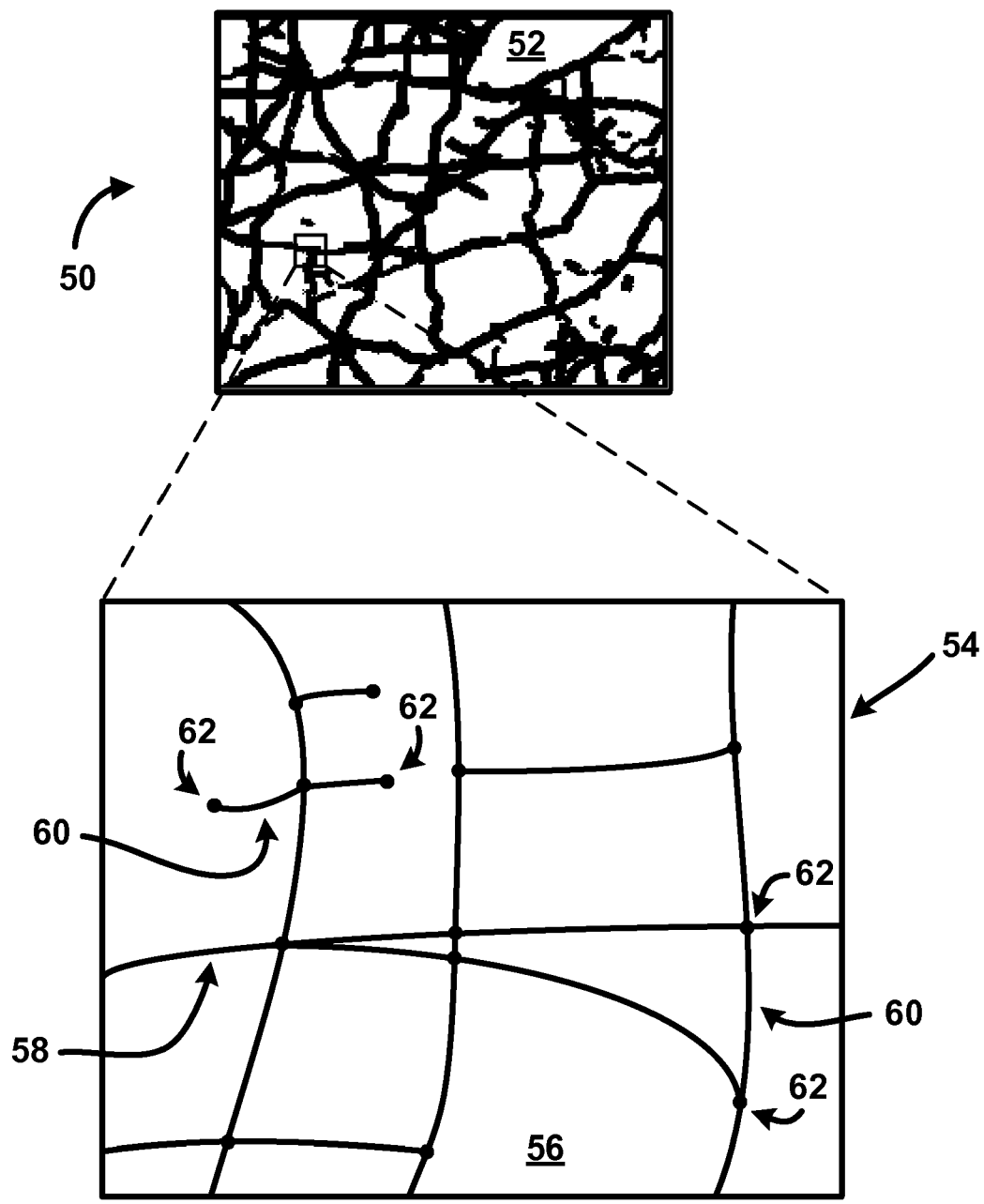
FIG. 2 shows a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
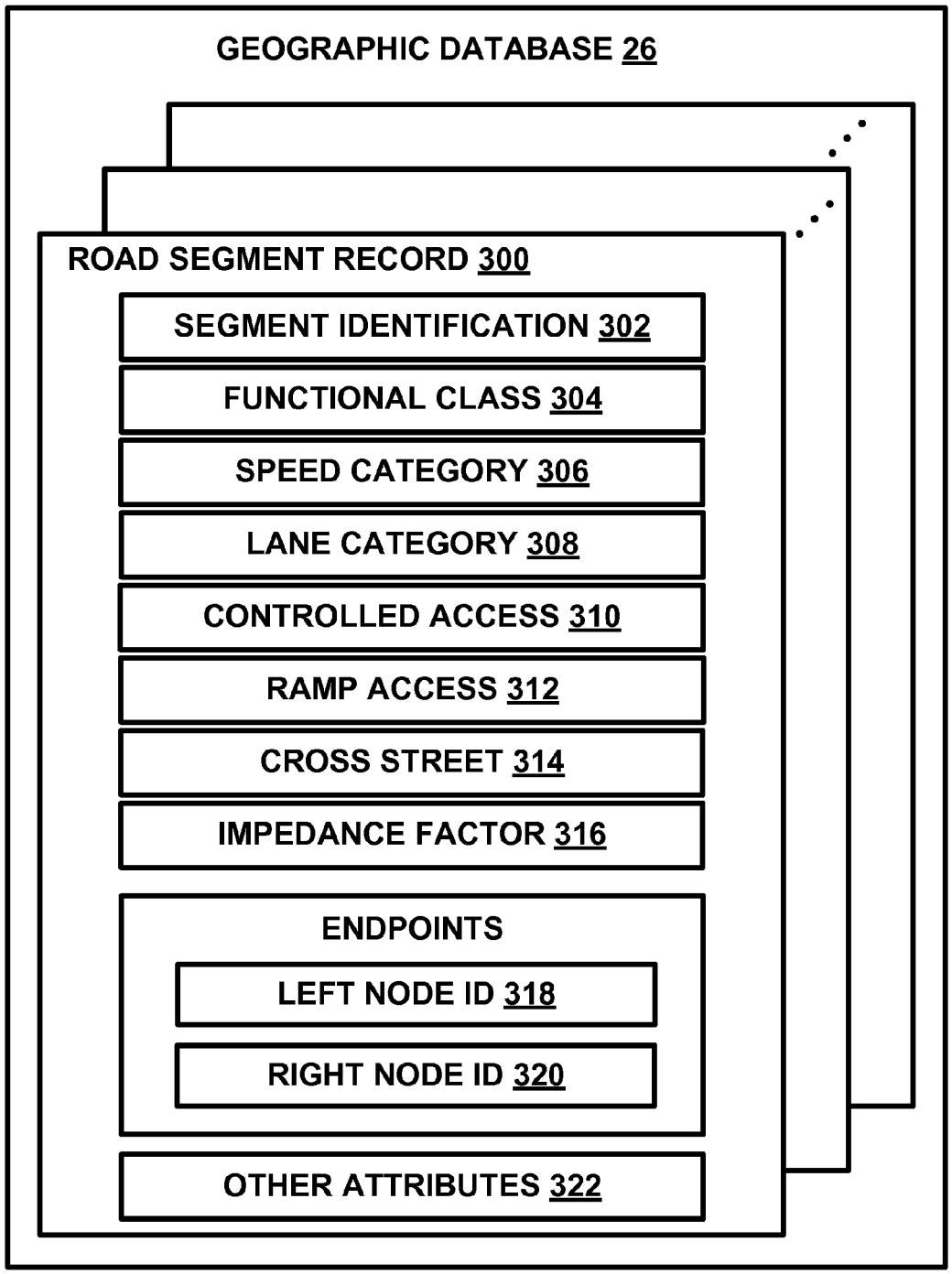
FIG. 3 is a block diagram of a geographic database that includes data that represents the geographic region of FIG. 2, according to an example.

FIG. 3 is a block diagram depicting of some of the data attributes for road segment data records 300 that may be found in the geographic database 26. The segment data attributes depicted in FIG. 3 include segment identification 302, functional class 304, speed category 306, lane category 308, controlled access 310, ramp access 312, cross streets 314, and impedance factor 316. The segment data attributes also include references to node data records in the form of node identification 318, 320 corresponding to endpoints of the segment. As this is not an exhaustive list of all the data attributes for the road segment data records 300, FIG. 3 also depicts other attributes 322.

The road segment data record 300 includes a segment ID 302 by which the data record can be identified in the geographic database 26. The segment ID 302 may be a numeric code, an alpha-numeric code, or any other string of numbers, letters, and/or symbols that can be used to identify the record.

The functional class attribute 304 represents a functional class of a road represented by the road segment record 300. The functional class defines a level within a hierarchical network used to determine a logical and efficient route for a traveler. For example, there may be five functional classes used to characterize roads. In this example, a functional class of "1" represents roads that allow for high volume, maximum speed traffic movement between and through major metropolitan areas. Functional class "1" is applied to roads with very few, if any, speed changes. Access to the road is usually controlled.

A functional class of "2" represents roads are used to channel traffic to roads represented by functional class "1" for travel between and through cities in the shortest amount of time. Functional class "2" is applied to roads with very few, if any, speed changes that allow for high volume, high speed traffic movement.

A functional class of "3" represents roads that interconnect functional class "2" roads and provide a high volume of traffic movement at a lower level of mobility than functional class "2" roads. A functional class of "4" represents roads which provide for a high volume of traffic movement at moderate speeds between neighborhoods. These roads connect with higher functional class roads to collect and distribute traffic between neighborhoods.

A functional class of "5" represents roads whose volume and traffic movement are below the level of any other functional class. In addition, walkways, truck only roads, bus only roads, and emergency vehicle only roads may be represented by functional class "5." Access roads, parking lanes, and connections internal to a complex, such as a shopping mall, may also be represented by functional class "5." Of course, other functional class definitions may be used.

The speed category attribute 306 represents the general speed trend of a road based on posted or implied speed limit. The speed category attribute 304 may contain data associated with the speed limit. Additionally or alternatively, the speed category attribute 304 may contain data associated with a speed range. For example, the speed category attribute 304 may include a data representation of the integer 1 for speeds exceeding 80 mph, the integer 2 for speeds in the range of 65-80 mph, the integer 3 for speeds in the range of 55-64 mph, and so on until the speed range includes 0 mph.

The lane category attribute 308 includes data regarding the number of lanes, including turn lanes and exit lanes. The lane category attribute 308 may also include data regarding lane connectivity, i.e., data indicating how lanes are connected between origin and destination road elements. The lane category attribute 308 may also include data regarding lane restrictions, including data indicating what restrictions apply to certain lanes in terms of time and usage.

The controlled access attribute 310 identifies roads with limited entrances and exits that allow uninterrupted high speed traffic flow, such as the interstate/freeway network in the United States and the motorway network in Europe. The controlled access attribute 310 contains flag data. For example, the flag data in the controlled access attribute 310 may represent YES (e.g., logic 1) if the represented segment is part of a controlled access road or NO (e.g., logic 0) if the represented segment is not part of a controlled access road.

The ramp attribute 312 identifies a segment as a ramp. Ramps are connectors that provide access between roads that do not cross at grade. The ramp attribute 312 may also contain flag data. For example, the flag data in the ramp attribute 312 may represent YES (e.g., logic 1) if the represented segment is a ramp or NO (e.g., logic 0) if the represented segment is not a ramp.

The cross street attribute 314 includes data that represents a street that crosses the street represented by the road segment record 300. For example, the cross street attribute 314 may contain or reference data representing functional class, speed category, lane category, controlled access, and ramps for the cross street, in a similar manner as the attributes 304-312 of the road segment record 300.

The impedance factor attribute 316 represents the probability of accelerations and/or decelerations on the segment. For example, the impedance factor for a segment may be VERY LOW, LOW, MEDIUM, HIGH, and VERY HIGH. An impedance factor of VERY LOW may be assigned to a segment associated with a freeway, where normal traffic flow is relatively unimpeded. An impedance factor of LOW or MEDIUM may be assigned to a segment associated with a major arterial where traffic lights, if any, favors traffic flow on these roads as opposed to cross streets. An impedance factor of HIGH or VERY HIGH may be assigned to a segment associated with roads having stop signs or traffic lights that do not favor traffic flow on these roads. Other impedance factor values may be used. Additionally, the number of impedance factors may be more or less than the five factors mentioned.

While the location of traffic lights and stop signs are indicative of an impedance factor assignment, it is very expensive to collect data regarding these road features. As described with respect to FIGS. 4 and 5, probe data may be used for determining an appropriate impedance factor for a road segment. Probe data is point data collected from a moving vehicle having a device that can identify vehicle position as a vehicle travels along a road network. For example, the device may use cellular technology or GPS technology to monitor the vehicle's position on the road network. By monitoring the vehicle's movement, the probe data can be used to determine travel time, which can then be used to calculate speed of the vehicle.

III. Impedance Factor Classification with Probe Data

Figure 4:
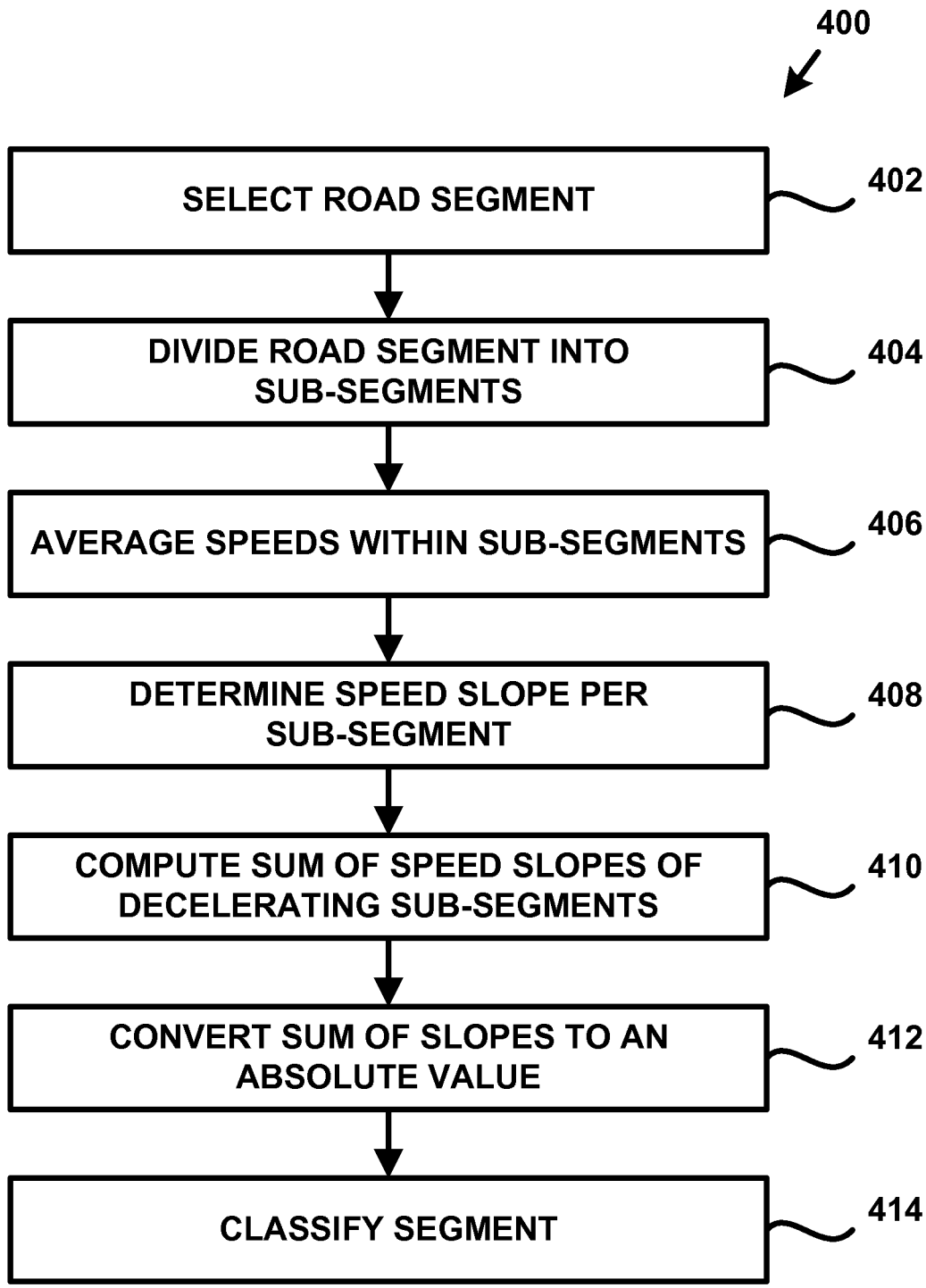
FIG. 4 is a flow chart of a method for classifying a segment, according to an example.

FIG. 4 is a flow chart of a method 400 for determining an impedance factor for a road segment. For road segments that are bidirectional, the method 400 may be performed for each direction. The method 400 may be performed by any combination of hardware and software. For example, the method 400 may be performed by a computer located at a central facility that receives probe data from a variety of sources.

Figure 5:
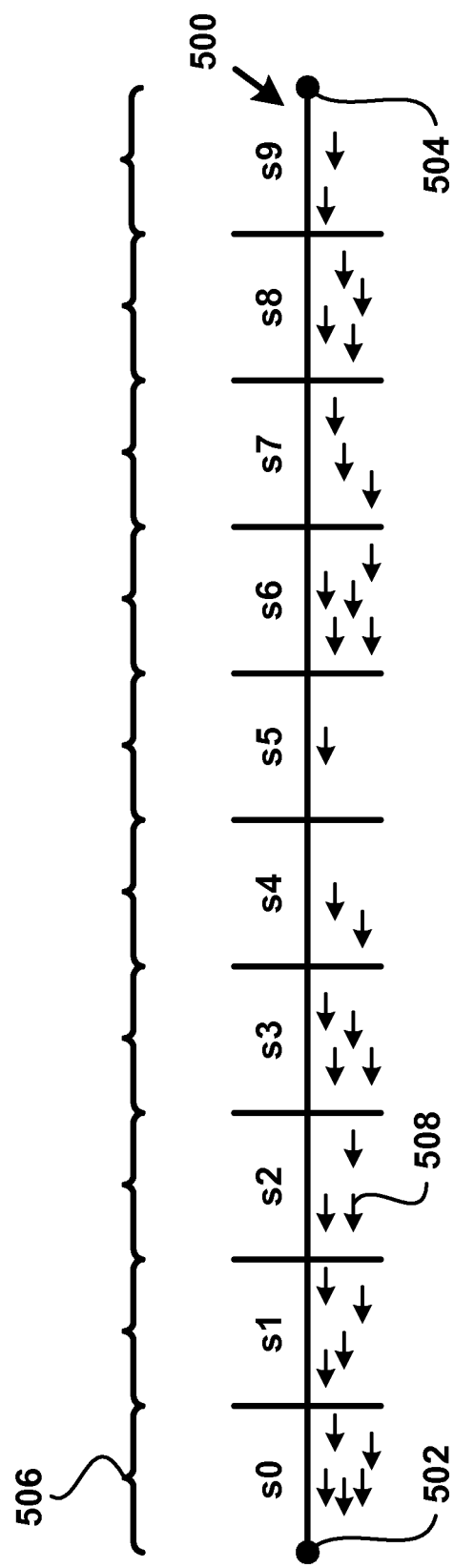
FIG. 5 depicts a road segment, according to an example.

At block 402, the computer selects a road segment to be classified with an impedance factor. The selected road segment is associated with probe data in sufficient quantities for analysis. For example, the selected road segment may be associated with more than one hundred probe points. FIG. 5 depicts a road segment 500. The road segment 500 has a first node 502 and a second node 504. In this example, the computer selects the road segment 500.

At block 404, the computer divides the road segment 500 into sub-segments 506. The sub-segments 506 are substantially the same length in terms of distance. FIG. 5 depicts that the road segment 500 is divided into ten sub-segments 506 between the first and second nodes 502, 504. The road segment 500 may be divided into other numbers of sub-segments 506.

At block 406, the computer groups and averages speeds of probe points associated with a sub-segment 506. FIG. 5 depicts probe points 508 as arrows. For example, there are five probe points 508 associated with the sub-segment 506 closest to the first node 502 (first sub-segment). The computer averages the speed of the five probe points 508 in the first sub-segment 506 to obtain the speed s0. The computer performs the same computation for each of the other sub-segments 506 to obtain the average speeds s1, s2, . . . , s9.

At block 408, the computer determines a speed slope per sub-segment 506. The speed slope is calculated using Equation 1 as follows.

$$\text{Speed Slope} = (\text{avg. speed } s_i - \text{avg. speed } s_{i+1})/\text{avg. speed } s_i \quad \text{(Equation 1)}$$

For the first sub-segment 506, the computer calculates the speed slope of (s0–s1)/s0. The speed slope may be positive (average speed at $s_i$ is greater than the average speed at $s_{i+1}$) or negative (average speed at $s_i$ is less than the average speed at $s_{+1}$). A sub-segment 506 associated with a negative speed slope is referred to as a decelerating sub-segment.

At block 410, the computer computes a sum of slopes for all decelerating sub-segments. For convenience, at block 412 the computer converts the sum of slopes to an absolute value. It is understood the computer can assign impedance factors using negative numbers by changing the classification rules described with reference to block 414. The sum of slopes (or the absolute value of the sum of slopes if converted) is referred to herein as the "segment slope."

At block 414, the computer determines the selected segment's impedance factor based at least in part on the segment slope value. Generally, a road segment classified as VERY HIGH has a segment slope value greater than a road segment classified as HIGH. Similarly, a road segment classified as HIGH has a segment slope value greater than a road segment classified as MEDIUM; a road segment classified as MEDIUM has a segment slope value greater than a road segment classified as LOW; and a road segment classified as LOW has a segment slope value greater than a road segment classified as VERY LOW. However, other variables (e.g., segment and/or sub-segment average speed) may be used to generate classification rules.

For example, road segments with a steep segment slope value (e.g., greater than 1.5) and a low average segment speed for the last sub-segment 506 in the direction of travel (e.g., less than 15 kph) may be classified as VERY HIGH. Road segments with approximately zero segment slope (i.e., uniform speed) and the average speed across the segment is above a threshold value (e.g., 75 kph) may be classified as VERY LOW. Similar rules may be used to classify the road segment as HIGH (e.g., segment slope greater than 0.75 and segment average speed less than 1.5 kph), MEDIUM (e.g., segment slope greater than 0.5 and segment average speed less than 0.75 kph), and LOW (segment slope less than 0.1). While these classification rules are provided as examples, the classification of impedance factors may be based on other rules. The impedance factor classifications are stored as data in the impedance factor attribute 316 for the associated road segments.

IV. Impedance Factor Classification Without Probe Data

As described with reference to block 402, the method 400 works when the selected road segment is associated with probe data in sufficient quantities for analysis. However, not all road segments are associated with sufficient quantities of probe data to assign an impedance factor to a road segment. In these cases, data associated with previously classified road segments may be used to classify road segments without enough probe data.

Statistical machine learning techniques may be used to determine the correlation between map database attributes and the impedance factors for road segments that have been classified using the method 400. For example, the functional class attribute 304, the speed category attribute 306, the lane category attribute 308, the controlled access attribute 310, the ramp attribute 312, and the cross street attributes 314 may be used to determine the correlation. These correlations may be used to create a prediction model for the segments that have not been classified to determine their impedance factor category.

Figure 6:
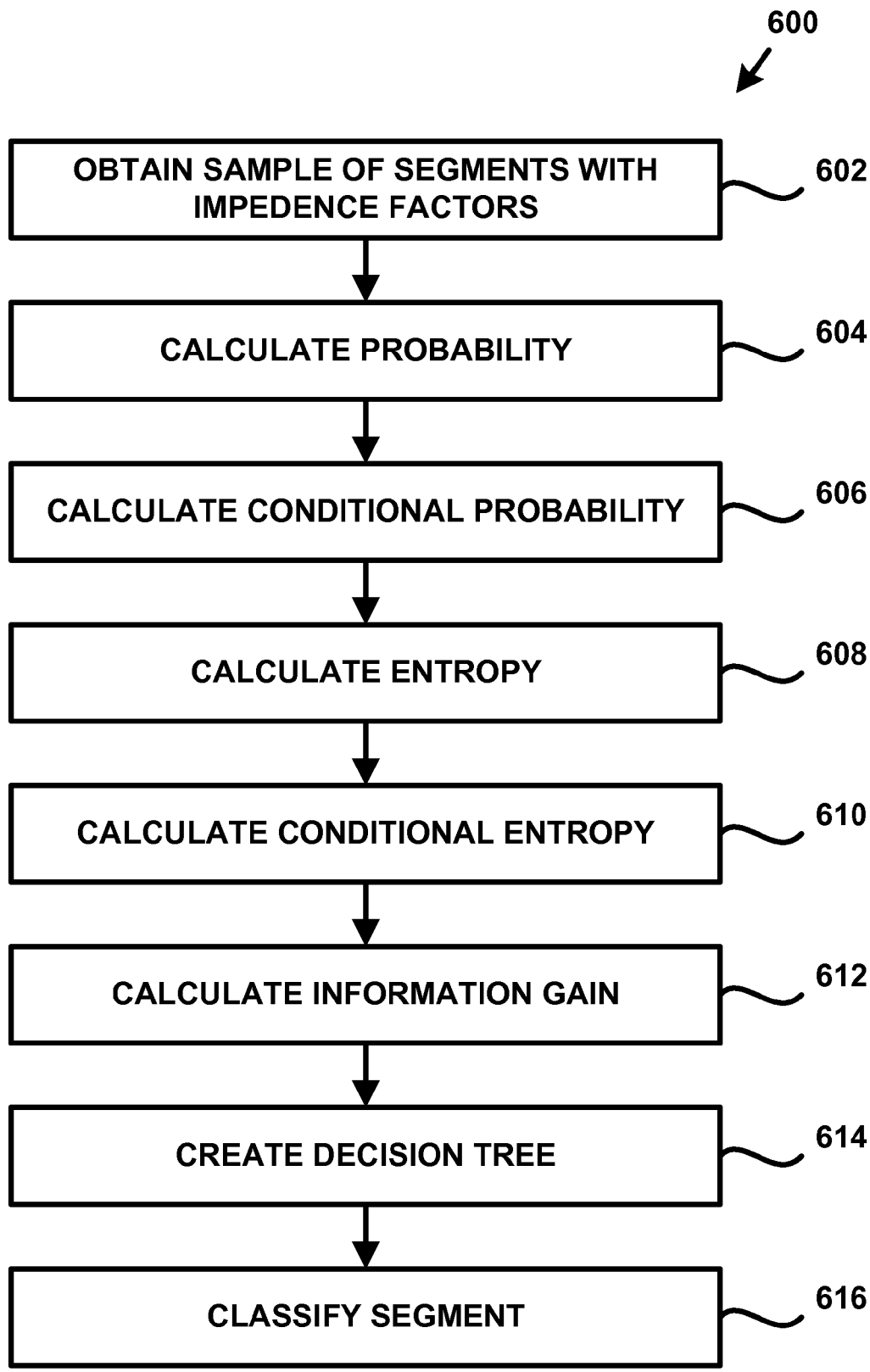
FIG. 6 is a flow chart of a method for classifying a segment, according to another example.

FIG. 6 is a flow chart of a method 600 for classifying road segments without sufficient probe data to be classified using the method 400. In this example, a decision tree prediction model is used. However, other machine learning techniques may also be used. The method 600 may be performed by any combination of hardware and software. For example, the method 600 may be performed by the same or a different computer than the computer that executed the method 400.

At block 602, the computer obtains a random sample of road segments that have been assigned an impedance factor (e.g., VERY HIGH, HIGH, MEDIUM, LOW, VERY LOW) based on probe data. The random sample may be separated by functional class. For example, the random sample may include ten thousand road segments for each of the functional classes 1-4.

At block 604, the computer calculates the probability that a functional class sample is assigned a particular impedance factor (e.g., $P_{VERYHIGH}$, $P_{HIGH}$, $P_{MED}$, $P_{LOW}$, $P_{VERYLOW}$).

At block 606, the computer calculates the conditional probability of each impedance factor given a particular map database attribute. Conditional probability is the probability of some event A, given the occurrence of some other event B. For example, using the speed category attribute 306, the conditional probability for a functional class sample having the probability of VERY HIGH is: ($P_{VERYHIGH|SPEED\_CAT=1}$, $P_{VERYHIGH|SPEED\_CAT=2}$, $P_{VERYHIGH|SPEED\_CAT=3}$, $P_{VERYHIGH|SPEED\_CAT=4}$). The conditional probabilities for the remaining impedance factor values are calculated in the same manner. In addition, other map attributes are also used in the condition probability calculations, such as the lane category attribute 308, the controlled access attribute 310, the ramp attribute 312, and the cross street attributes 314.

At block 608, the computer calculates the entropy of the impedance factors. Entropy is a measure of the uncertainty associated with a random variable. The entropy is defined in Equation 2 as follows.

$$H = -(P_{VERYHIGH} * \log(P_{VERYHIGH})) - (P_{HIGH} * \log(P_{HIGH})) - (P_{MED} * \log(P_{MED})) - (P_{LOW} * \log(P_{LOW})) - (P_{VERYLOW} * \log(P_{VERYLOW})) \quad \text{(Equation 2)}$$

At block 610, the computer calculates the conditional entropy for each map database attribute. Conditional entropy quantifies the entropy (i.e., uncertainty) of a random variable Y given that the value of another random variable X is known. Generally, the conditional entropy is calculated as H(Impedance Factor I Map Database Attribute). The computer calculates the conditional entropy for all combinations of impedance factors (e.g., $P_{VERYHIGH}$, $P_{HIGH}$, $P_{MED}$, $P_{LOW}$, $P_{VERYLOW}$) and map database attributes (e.g., speed category attribute 306, lane category attribute 308, controlled access attribute 310, ramp attribute 312, cross street attributes 314).

At block 612, the computer calculates the information gain for each map database attribute. In machine learning, the information gain may be used to define a preferred sequence of attributes to investigate to most rapidly narrow down the state of or a random variable. Usually, an attribute with high information gain is preferred to other attributes. Generally, the information gain for a map database attribute is equal to the conditional entropy for the attribute calculated at block 610 less the entropy calculated at block 608. For example, the information gain for the speed category attribute is equal to the conditional entropy for the speed category attribute (i.e., H(Impedance FactorISpeed Category) less the entropy (Equation 2).

At block 614, the computer generates a decision tree using the information gain values calculated at block 612. The map database attribute having the highest information gain value is selected as the top level of the decision tree. The map database attribute having the next highest information gain value is located at the next level in the decision tree. This process continues until the map database attribute having the lowest information gain value is selected for the bottom level of the decision tree. Alternatively, the process of generating a decision tree may end when reaching a threshold value for the information gain (i.e., when pruning is enabled). Each node on the decision tree is assigned the impedance factor category that occurs most for that value of the map database attribute.

Figure 7:
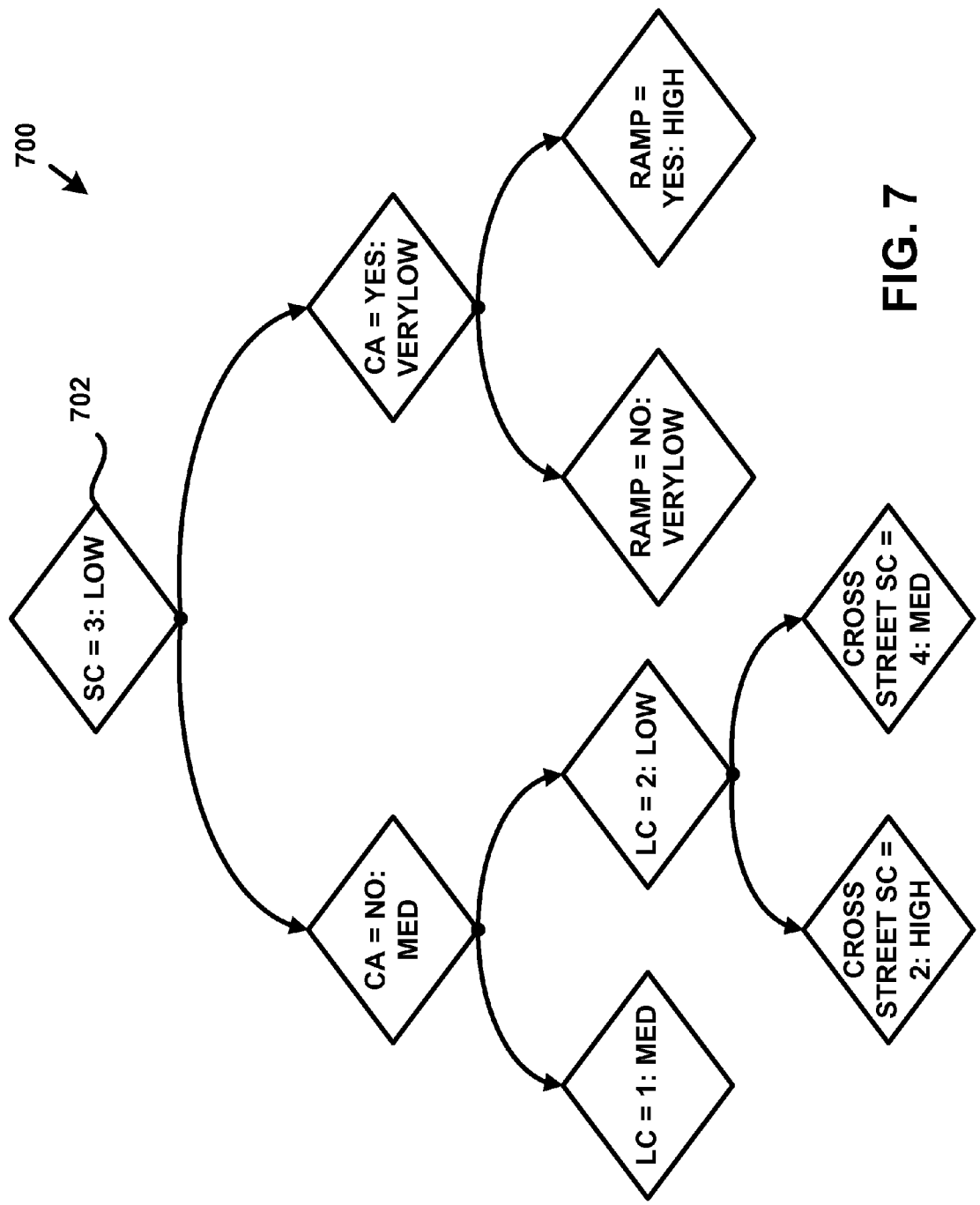
FIG. 7 is a decision tree, according to an example.

FIG. 7 depicts an example decision tree 700. In this example, the speed category attribute ("SC") having the value of three is placed at the top level node 702 of the decision tree 700. The top level node 702 is coded as a LOW impedance factor because most segments in the sample having a speed category of three have been classified with a low impedance factor. Each of the lower levels in the decision tree 700 have nodes defined by map database attributes (controlled access ("CA"), lane category ("LC")) having diminishing levels of information gain and the impedance factor category that occurs most for that map database attribute.

At block 616, the computer determines an impedance factor category for road segments without sufficient probe data using the decision tree 700 created at block 614. The map data attributes for a road segment are used to traverse the decision tree 700 until a leaf node is reached. The impedance factor assigned to that leaf node is selected as the impedance factor for the road segment. This impedance factor classification is stored as data in the impedance factor attribute 316 for the road segment.

V. Using Impedance Factor in Energy Efficient Routing

Generally, route calculation involves determining an optimum route from a start location to a destination location. A route may be considered the "optimum" route based on different route qualities, such as shortest, fastest, and most energy efficient. To determine the optimum route, the route calculation algorithm minimizes route cost, where "cost" in this context is a generic expression for the quantity (e.g., time, distance, or energy) to be minimized. The route cost also may be based on a combination of such quantities. The cost is typically calculated for each road segment along the route and the cost of a route is the sum of the costs for all its road segments.

The amount of energy consumed by a vehicle while traveling on a road is impacted by the number of stop signs and traffic lights on that road. However, it is expensive to collect data regarding the location of stop signs and traffic lights. When stop sign and traffic light location data is unavailable, the route calculation application 34 uses the data stored in the impedance factor attribute 316 as the segment cost or as part of the segment cost in calculating an energy efficient route. Additionally, the route calculation application 34 may use the data stored in the impedance factor attribute 316 even when stop sign and traffic light location data is available.

VI. Using Impedance Factor to Correct Map Database Data

The impedance factor may also be used by a map developer to correct or add map data in a map database. For example, if a road segment is associated with data indicating a stop sign and/or a traffic light and the impedance factor for this segment is VERY LOW, the stop sign and/or the traffic light may have been coded incorrectly in the map database. As another example, if a road segment has an impedance factor of HIGH and a functional class of 5, the functional class may have been coded incorrectly in the map database. A set of rules may be created to identify map database errors using the impedance factor classifications.

VII. Multiple Impedance Factor Classifications

More than one impedance factor may be assigned to a segment based on time, day of the week, season, special events, dynamic road configurations (e.g., lane restrictions, reversible lanes), and so on. For example, during rush hours, vehicles typically stop longer than usual at traffic signals. In this example, the impedance factor for a segment during rush hours may be different than the impedance factor during non-rush hours. To determine the impedance factor classification for different time periods, the method 400 may be implemented using probe data grouped by time periods. While the example used two time periods, it is understood that more than two impedance factor classifications may be performed per segment.

As another example, more than one impedance factor may be assigned to a segment based on distance along a segment. As shown in FIG. 5, a road segment is divided into sub-segments. Based on the probe data, it may be appropriate to generate a first impedance factor for the four sub-segments located closest to the first node 502 and a second impedance factor for the six sub-segments located closest to the second node 504. Of course, the impedance factor classifications do not need to be assigned based on the location of the segment divisions.

As yet another example, more than one impedance factor may be assigned to a segment based on connecting segments. If it is possible to travel from a first segment to multiple other segments (e.g., at an intersection), multiple impedance factors may be assigned to a segment based on whether a vehicle needs to turn to travel on one of the other connecting segments. For example, a first impedance factor may be generated for a right turn onto a connecting segment, a second impedance factor may be generated for a left turn onto a connecting segment, and a third impedance factor may be generated for traveling straight onto the connecting segment. Other segment connections and impedance factor assignments are also possible.

VIII. Conclusion

Impedance factor classifications can be quickly and cheaply derived from probe data. By using impedance factor classifications, an energy-efficient route may be easily calculated even when traffic light and stop sign location data is unavailable. Moreover, the impedance factor classifications may be used to detect errors in a map database.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer-implemented method for calculating road segment cost for energy efficient routing, comprising:
    receiving probe data collected via a probe for one or more vehicles traveling along a road;
    selecting a road segment with associated probe data;
    dividing the road segment into sub-segments;
    calculating, using a processor, an average speed for each sub-segment using the probe data;
    calculating, using the processor, a speed slope for each sub-segment as a function of an average speed of the sub-segment and an average speed of at least one adjacent sub-segment;
    calculating, using the processor, a sum of speed slopes by adding the speed slope values for sub-segments having a negative value of speed slope; and
    classifying the road segment based on the sum of speed slopes.

2. The method of claim 1, further comprising:
    converting the sum of speed slopes to an absolute value prior to classifying the road segment.

3. The method of claim 1, further comprising:
    storing data representing a classification of the road segment in a map database.

4. The method of claim 1, wherein the classification of the road segment stored in the map database is used as a segment cost during route calculation.

5. The method of claim 3, wherein the classification of the road segment stored in the map database is configured to identify errors in the map database.

6. The method of claim 1, wherein the road segments are classified with an impedance factor of VERY HIGH, HIGH, MEDIUM, LOW, or VERY LOW.

7. The method of claim 6, wherein a road segment classified as VERY HIGH has a sum of speed slopes value greater than a road segment classified as HIGH.

8. The method of claim 6, wherein a road segment classified as HIGH has a sum of speed slopes value greater than a road segment classified as MEDIUM.

9. The method of claim 6, wherein a road segment classified as MEDIUM has a sum of speed slopes value greater than a road segment classified as LOW.

10. The method of claim 6, wherein a road segment classified as LOW has a sum of speed slopes value greater than a road segment classified as VERY LOW.

11. The method of claim 1, wherein the road segments are classified with more than one impedance factor.

12. The method of claim 1, wherein the speed slope equals the average speed of the sub-segment less the average speed of an adjacent sub-segment divided by the average speed of the sub-segment.

13. A method for calculating an energy efficient route, the method comprising:
    obtaining an origin and a destination associated with a road network;
    calculating a probability value that a vehicle decelerates while traveling on each individual segment of a plurality of road segments;
    selecting, from the plurality of road segments, a selected road segment with associated probe data;
    receiving probe data collected via a probe for the vehicle traveling along the selected road segment;
    dividing the selected road segment into a plurality of sub-segments;
    calculating an average speed for each of the plurality of sub-segments using the probe data; and
    calculating a speed slope for each of the plurality of sub-segment as a function of an average speed of the sub-segment and an average speed of at least one adjacent sub-segment; and
    calculating, using a processor, an energy efficient route from the origin to the destination using a routing algorithm that evaluates the plurality of road segments,
    wherein the routing algorithm uses the probability values for the plurality of road segments being evaluated by the routing algorithm.

14. The method of claim 13, further comprising:
    calculating a sum of speed slopes by adding the speed slope values for only those sub-segments having a negative value of speed slope; and
    classifying the road segment based on the sum of speed slopes.

15. The method of claim 14, further comprising:
    converting the sum of speed slopes to an absolute value prior to classifying the road segment.

16. The method of claim 13, wherein the speed slope equals the average speed of the sub-segment less the average speed of an adjacent sub-segment divided by the average speed of the sub-segment.

17. The method of claim 13, wherein at least one of the plurality of road segments is bidirectional, and a first probability value of the probability values is assigned to a first direction of the at least one of the plurality of road segments and a second probability value of the probability values is assigned to a second direction of the at least one of the plurality of road segments.

18. A navigation system that calculates an energy efficient route, the navigation system comprising:
    a probe configured to receive probe data collected for a vehicle traveling along a route from a first location to a second location;
    a geographic database containing road segment records that include data that represent roads in a geographic area that includes the route from the first location to the second location,
    wherein the road segment records include an impedance factor associated with a road segment,
    wherein the impedance factor represents a probability that the vehicle decelerates while traveling within the road segment; and
    a processor that executes a route calculation application that calculates a route that minimizes energy consumption when traveling from the first location to the second location, wherein the route is calculated using segment costs, and wherein the segment costs are based on the impedance factor, wherein the processor is configured to calculate the impedance factor by dividing the road segment into a plurality of sub-segments and calculating an average speed for each of the plurality of sub-segments using the probe data, wherein the processor is configured to calculate a speed slope for each sub-segment as a function of an average speed of the sub-segment and an average speed of at least one adjacent sub-segment.

19. The navigation system of claim 18, wherein the processor is configured to calculate a sum of speed slopes by adding the speed slope values for only those sub-segments having a negative value of speed slope, and classify the road segment based on the sum of speed slopes.

\* \* \* \* \*